United States Patent [19]
Okamoto et al.

[11] Patent Number: 6,154,266
[45] Date of Patent: *Nov. 28, 2000

[54] METHOD OF MANUFACTURING LIQUID CRYSTAL DISPLAY DEVICE

[75] Inventors: Mamoru Okamoto; Toshiaki Ishiyama, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/040,745

[22] Filed: Mar. 18, 1998

[30] Foreign Application Priority Data

Mar. 31, 1997 [JP] Japan ................................. 9-081236

[51] Int. Cl.[7] .................................................. G02F 1/1337
[52] U.S. Cl. ........................................ 349/129; 349/141
[58] Field of Search ....................................... 349/129, 141

[56] References Cited

U.S. PATENT DOCUMENTS 5,745,206  4/1998  Koike et al. ............................ 349/129

FOREIGN PATENT DOCUMENTS

| 2-204725 | 8/1990 | Japan . |
|---|---|---|
| 4-195119 | 7/1992 | Japan . |
| 4-285917 | 10/1992 | Japan . |
| 4-355725 | 12/1992 | Japan . |
| 7-248499 | 9/1995 | Japan . |
| 7-306417 | 11/1995 | Japan . |
| 7-333619 | 12/1995 | Japan . |
| 9-33946 | 2/1997 | Japan . |

*Primary Examiner*—James A. Dudek
*Attorney, Agent, or Firm*—McGinn & Gibb, P.C.

[57] ABSTRACT

In a method of manufacturing a liquid crystal display device for applying between electrodes lateral electric field in parallel to a substrate to control liquid crystal disposed between first and second substrates, when a rubbing treatment is conducted on an orientation film (15) on a first substrate having gate bus lines (7) and drain bus lines (8), active elements (9) arranged in a matrix form in correspondence with the respective intersection points of the gate and drain bus lines (7, 8), and a common electrode 11 and a pixel electrode 12 which are provided in an interdigital arrangement in each unit pixel portion, the rubbing treatment is conducted twice so that a first rubbing direction (13) set in the first rubbing step is opposite to a second rubbing direction (14) set in the second rubbing step by 180 degrees.

10 Claims, 7 Drawing Sheets

METHOD OF MANUFACTURING LIQUID CRYSTAL DISPLAY DEVICE

BACKGROUND OF THE INVENTION

1. Field of the Invention

The present invention relates to a method of manufacturing such a type of liquid crystal display device that liquid crystal is controlled by electric field applied in a direction parallel to a substrate, and particularly to a method of manufacturing a liquid crystal display device which can control abnormality of orientation of the liquid crystal in the neighborhood of a common electrode and a picture element electrode (pixel electrode) of a unit picture element portion (unit pixel portion) to prevent reduction of contrast and also enhance the image quality.

2. Description of the Related Art

A TN (Twisted Nematic) type liquid crystal display device is known as one representative type of liquid crystal display devices for controlling liquid crystal by applying electric field in the direction vertical to a substrate (in the longitudinal direction). The TN type liquid crystal display device includes: a first transparent glass substrate having gate bus lines and drain bus lines, on which active elements and pixel electrodes are arranged in a matrix form at the respective intersection points between the gate bus lines and the drain bus lines; a second transparent glass substrate having a colored layer of R (red), G(green) and B(blue), a light shielding film and a common electrode; and a liquid crystal layer interposed between the first and second glass substrates. In such a TN type liquid crystal display device, the liquid crystal is controlled by electric field which is generated by applying an electric voltage between each of the pixel electrodes and the common electrode.

Besides, there is also known an IPS (in-plane switching) type of liquid crystal display device which is one representative type for controlling the liquid crystal by applying electric field in the direction parallel to the substrate (in the lateral direction). The IPS type liquid crystal display device includes: a first transparent glass substrate having gate bus lines and drain bus lines, on which active elements and interdigitally-arranged pixel electrodes and common electrodes are arranged in a matrix form at the respective intersection points between the gate bus lines and the drain bus lines; a second transparent glass substrate having a colored layer of R(red), G(green) and B(blue) and a light shielding film; and a liquid crystal layer disposed between the first and second transparent glass substrates. In this IPS type liquid crystal display device, the liquid crystal is controlled by applying a voltage between each pixel electrode and the common electrode, and thus electric field in the lateral direction is used.

A method of manufacturing the conventional IPS type liquid crystal display device will be described with reference to the accompanying drawings. FIG. 1 is a plan view showing a unit pixel portion of the conventional IPS type liquid crystal display device. FIG. 2A is a detailed diagram showing a rubbing processing direction in the unit pixel portion, and FIG. 2B is a cross-sectional view of FIG. 2A.

In a conventional process of manufacturing the IPS type liquid crystal display device, by performing a photolithography process at plural times, gate bus lines 37, drain bus lines 38 and active elements 39 are formed in a matrix form on a transparent glass substrate 36, and a common electrode 41 and a pixel electrode 42 are formed in a desired pattern of an interdigital arrangement in each unit pixel portion. Subsequently, as shown in FIG. 2B, by using an offset printing method or the like, an orientation film 45 is formed on the transparent glass substrate 36 on which the bus lines 37, 38, the active elements 39 and the electrodes 41 and 42 are formed, and then the surface of the orientation film 45 is subjected to a rubbing treatment which specifies the orientation direction of the liquid crystal molecules. As disclosed in Japanese Laid-open Patent Application No. Hei-7-306417, it is preferable that the rubbing treatment is performed in a direction 53 which traverses obliquely the interdigital arrangement of the common electrode 41 and the pixel electrode 42 as shown in FIG. 2A, that is, at an intersection angle of about 1 degree to 20 degrees to the normal direction of the electric field.

In the process of the liquid crystal display device, the interdigitally-arranged common electrode 41 and pixel electrode 42 in each unit pixel portion are designed so that the electrode width of each electrode is set to about 5 micron, the inter-electrode space is set to about 10 microns, about six pairs of electrodes are formed in each pixel portion and the film thickness of each electrode is set to 1000 to 2000 angstroms, so that a shady portion occurs in the vicinity of each electrode in the unit pixel portion due to the film thickness of the electrode, that is, due to an electrode step. Therefore, in the rubbing process, there occurs an area 60 (rubbing non-contact area) which has no or little orientation restricting force because in the above shady portion the tip of rubbing cloth is not or extremely weakly brought into contact with the orientation film 45 so that the orientation film 45 is not subjected to the rubbing treatment or subjected to the rubbing treatment with the rubbing strength of extremely weaker than that in other areas. If such an area 60 having no or little orientation restricting force exists in the orientation film 45 between the electrodes, the orientation direction of the liquid crystal molecules is not controlled to be uniform over the orientation film 45 between the electrodes, resulting in occurrence of an orientation abnormality in display. Therefore, the contrast is reduced, and hue is varied in accordance with a screen viewing angle to degrade the image quality.

A cause of the reduction in contrast as described above is as follows. That is, in the IPS system in which the control of the liquid crystal is performed by the electric field in the lateral direction, domains (reversely rotating domains) in which the liquid crystal molecules are rotated in the direction opposite to the normal rotational direction, etc. occur in the vicinity of the common electrodes 41 and the pixel electrodes 42 interdigitally-arranged in the unit pixel portion, and these domains appear as bright lines. Therefore, the brightness when displaying black is made higher, resulting in reduction of the contrast. Further, a cause of the reduction in image quality is as follows. If the viewing angle to the display plane exceeds 60 degrees in the vertical direction or in the right-and-left direction, a display looks colored even when the display is a white frame.

Therefore, means of solving the above problem has been required, however, it is the present situation for the IPS type liquid crystal device that no effective solving means has been supplied for the reduction of the image quality, etc. caused by the abnormality of orientation of the liquid crystal in the vicinity of the electrodes in the unit pixel portion.

On the other hand, in the case of the TN type liquid crystal display device, Japanese Laid-open Patent Application No. Hei-4-195119 discloses a method of carrying out the rubbing treatment at plural times in the forward and backward directions alternately while reducing the rubbing intensity to solve the problem of the reduction of the image quality, etc. which is caused by the occurrence of the rubbing non-contact area. However, in the case of this method, any previous rubbing history is not left, and as a result it is equivalent to a rubbing treatment which is merely carried out in the direction when the last rubbing. Therefore, the orientation control in the vicinity of the electrodes cannot be performed. As other methods have been proposed a method of designing the four corner portions of the pixel electrode in an arcuate form (Japanese Laid-open Patent Application No. Hei-4-285917), and a method of irradiating ultraviolet rays after rubbing to reduce the pre-tilt angle of the liquid crystal if the liquid crystal of the liquid crystal display device is limited to ferroelectric liquid crystal (Japanese Laid-open Patent Application No. Hei-7-333619). In any method, a manufacturing apparatus must be designed in a large scale, and also it is difficult to form a pattern having arcuate corner portions is complicated and to control the irradiation amount of ultraviolet rays, so that the manufacturing process is very difficult. Further, a method of laminating liquid crystal cells (Japanese Laid-open Patent Application No. Hei-2-204725, for example) is proposed as another method. However, in this method, transmittance is reduced to the half, so that the brightness of back light must be increased to two times and the power consumption is increased. Therefore, it is difficult to practically use this method.

SUMMARY OF THE INVENTION

An object of the present invention is to provide a method of manufacturing a liquid crystal display device for controlling liquid crystal by applying electric field in a direction parallel to a substrate, which controls an orientation abnormality of the liquid crystal in the vicinity of a common electrode and a pixel electrode interdigitally-arranged in a unit pixel portion, prevents reduction in contrast, and prevents the image quality from being dependent on the viewing angle in the vertical and right-and-left directions to thereby enhance the image quality.

In order to attain the above object, according to a first aspect of the present invention, a method of manufacturing a liquid crystal display device which comprises the steps of disposing gate bus lines and drain bus lines on a first transparent substrate, disposing active elements in a matrix form at the respective intersection points between the gate bus lines and the drain bus lines, disposing a common electrode and a pixel electrode in an interdigitally arrangement, disposing a light shielding film and a colored layer on a second transparent substrate which is provided so as to confront the first transparent substrate, disposing on each of the first and second substrates an orientation film which is subjected to a rubbing treatment, and generating lateral electric field in a direction parallel to the substrate between the electrodes to control liquid crystal disposed between the first and second substrates, is characterized by further comprising at least the step of carrying out the rubbing treatment on the orientation film on the first transparent glass substrate while the rubbing process is divided into first and second steps so that a first rubbing direction set in the first rubbing step and a second rubbing direction set in the second rubbing step are opposite to each other by 180 degrees.

According to a second aspect of the present invention, in the liquid crystal display device manufacturing method as described above, when the orientation film on the first transparent glass substrate is subjected to the rubbing treatment, two rubbing rollers rotating in the opposite directions are used, and the first transparent substrate on which the orientation film is formed is sequentially passed just below the two rubbing rollers.

According to a third aspect of the present invention, a method of manufacturing a liquid crystal display device which comprises the steps of disposing gate bus lines and drain bus lines on a first transparent substrate, disposing active elements in a matrix form at the respective intersection points of the gate bus lines and the drain bus lines, disposing a common electrode and a pixel electrode in an interdigitally arrangement, disposing a light shielding film and a colored layer on a second transparent substrate which is provided so as to confront the first transparent substrate, disposing on each of the first and second substrates an orientation film which is subjected to a rubbing treatment, and generating lateral electric field in a direction parallel to the substrate between the electrodes to control liquid crystal disposed between the first and second substrates, is characterized in that when the orientation film formed on each of the first and the second substrates is subjected to the rubbing treatment, a first rubbing treatment is first conducted on the overall surface of the substrate in a first rubbing direction, unit pixel portions are masked every other row or every other group of plural rows, and a second rubbing treatment is carried out on non-masked rows of the unit pixel portions to rub the non-masked rows in a second rubbing direction which is opposite to the first rubbing direction by 180 degrees.

According to a fourth aspect of the present invention, a method of manufacturing a liquid crystal display device which comprises the steps of disposing gate bus lines and drain bus lines on a first transparent substrate, disposing active elements in a matrix form at the respective intersection points of the gate bus lines and the drain bus lines, disposing a common electrode and a pixel electrode in an interdigitally arrangement, disposing a light shielding film and a colored layer on a second transparent substrate which is provided so as to confront the first transparent substrate, disposing on each of the first and second substrates an orientation film which is subjected to a rubbing treatment, and generating lateral electric field in a direction parallel to the substrate between the electrodes to control liquid crystal disposed between the first and second substrates, is characterized in that when the orientation film formed on each of the first and the second substrates is subjected to the rubbing treatment, a first rubbing treatment is first conducted on the overall surface of the substrate in a first rubbing direction, unit pixel portions are masked every other column or every other group of plural columns, and a second rubbing treatment is carried out on non-masked columns of the unit pixel portions to rub the non-masked columns in a second rubbing direction which is opposite to the first rubbing direction by 180 degrees.

BRIEF DESCRIPTION OF THE DRAWINGS

FIGS. 2A and 2B are diagrams showing the conventional liquid crystal display device manufacturing method, wherein FIG. 2A is a detailed diagram showing the rubbing treatment direction of the unit pixel portion of FIG. 1, and FIG. 2B is a cross-sectional view of FIG. 2A;

DETAILED DESCRIPTION OF THE PREFERRED EMBODIMENTS

Preferred embodiments according to the present invention will be described hereunder with reference to the accompanying drawings.

Figure 1:
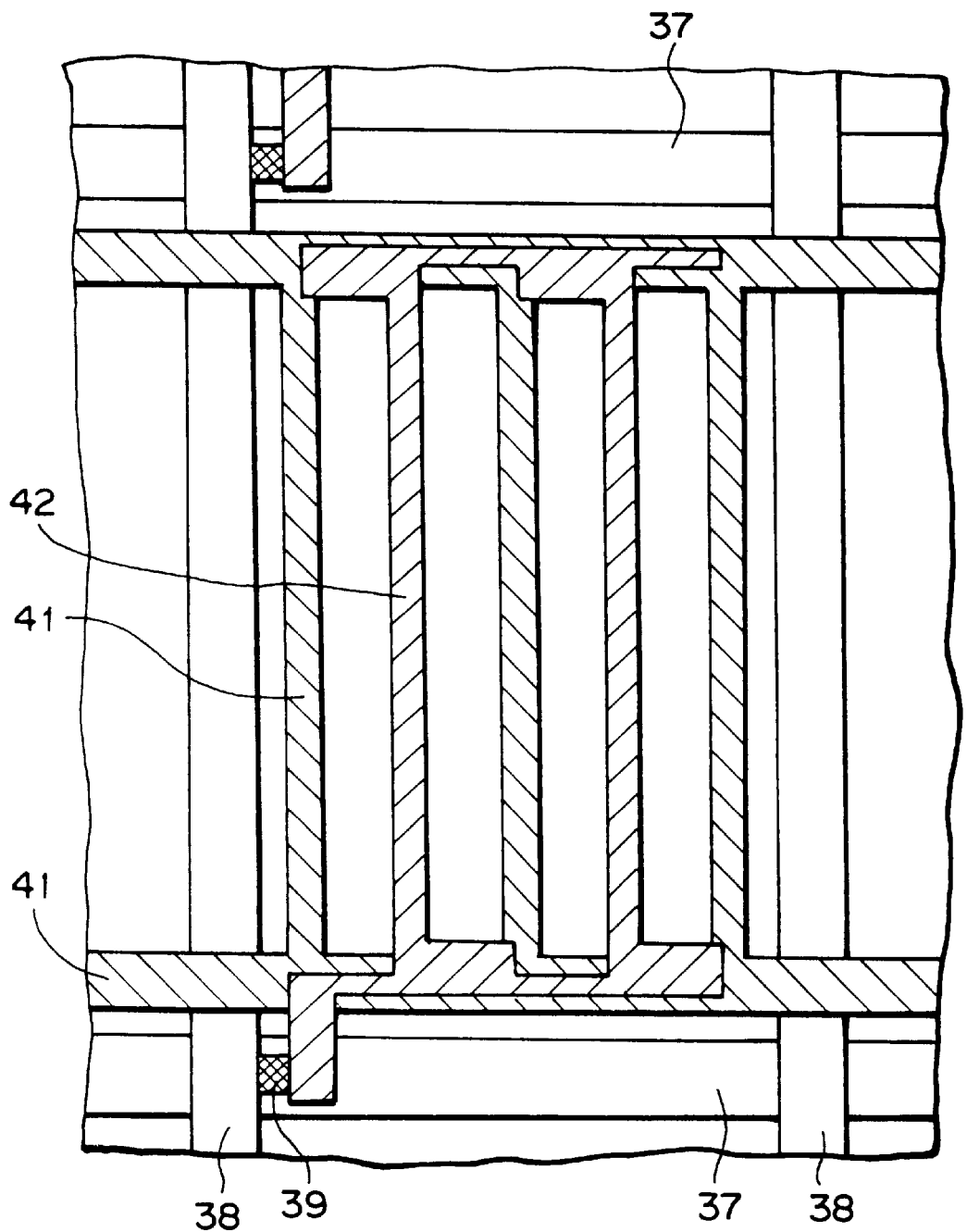
FIG. 1 is a plan view showing a unit pixel portion of an IPS type liquid crystal display device to explain a conventional method of manufacturing a liquid crystal display device.
Figure 2A:
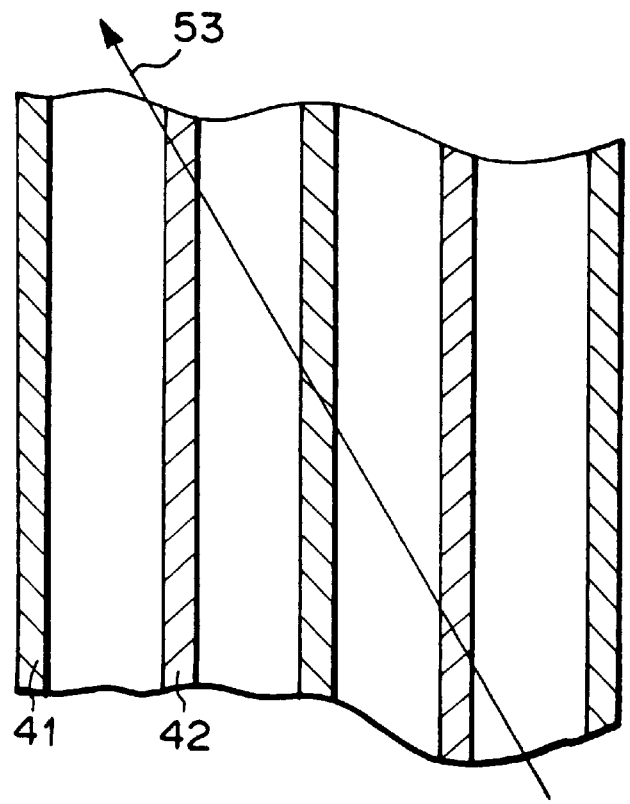
Figure 2B:
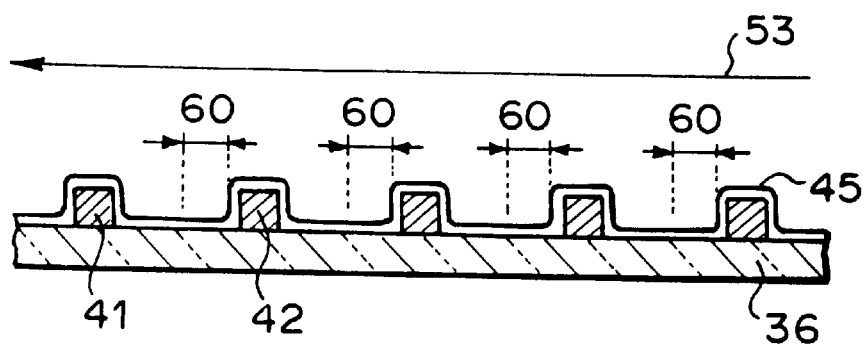
Figure 3:
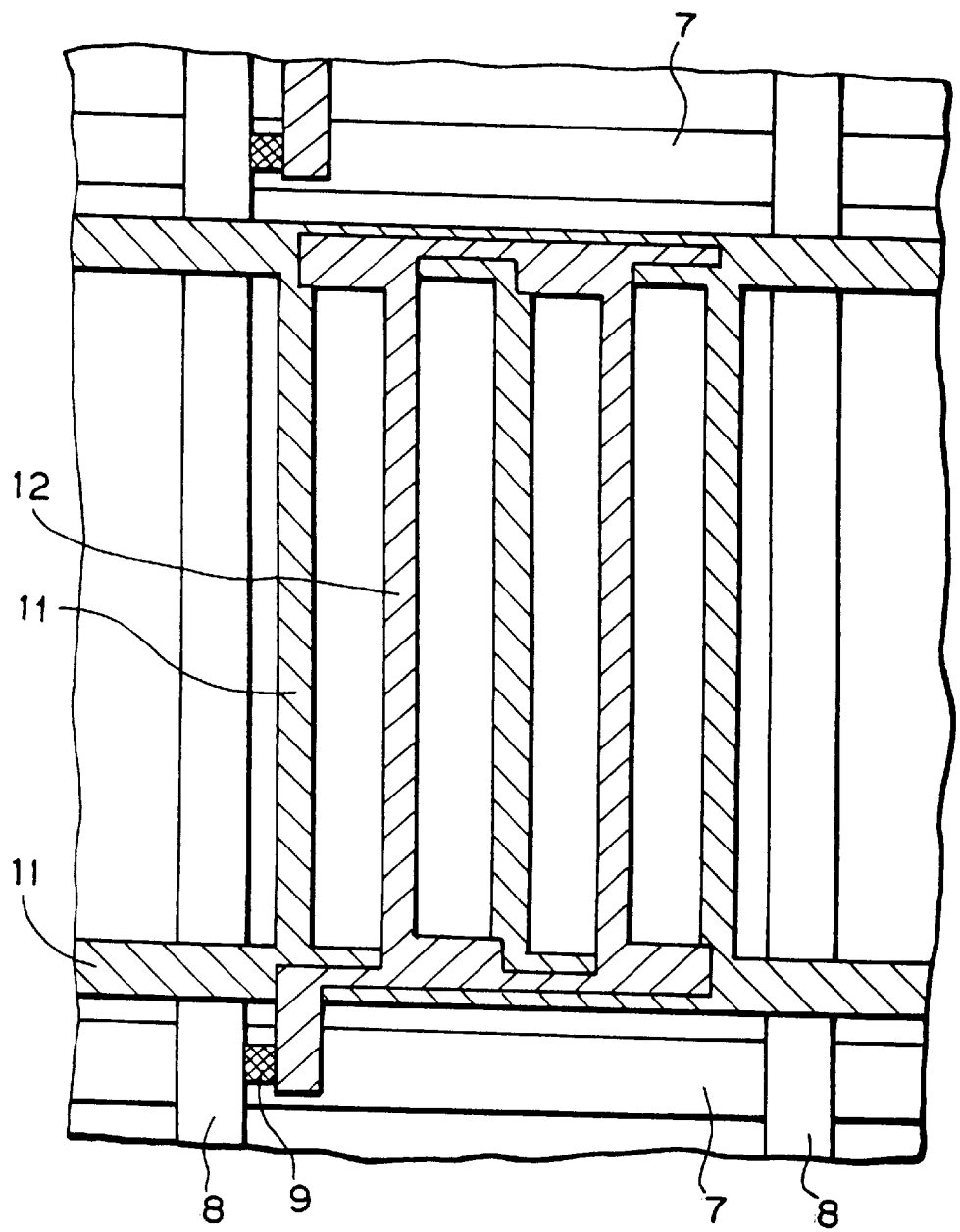
FIG. 3 is a plan view showing a unit pixel portion of a liquid crystal display device to explain a first embodiment of a liquid crystal display device manufacturing method according to the present invention.
Figure 4A:
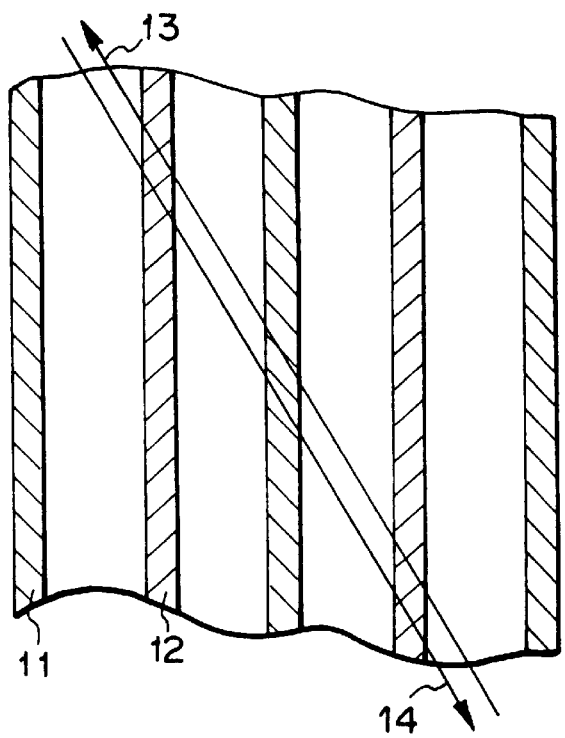
FIGS. 4A is a detailed diagram showing a rubbing treatment direction of the unit pixel portion of FIG. 3.
Figure 4B:
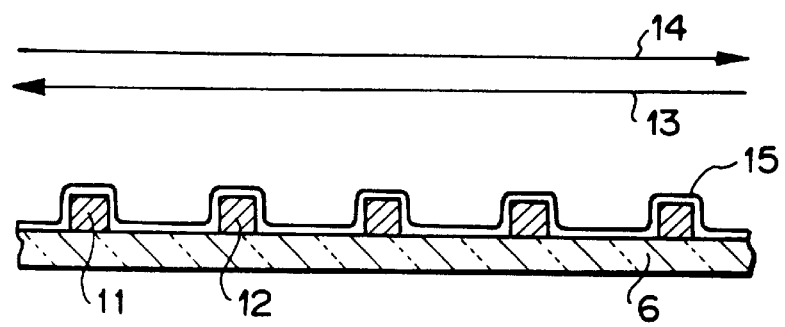
FIG. 4B is a cross-sectional view of FIG. 3.

FIG. 3 shows a first embodiment in which the present invention is applied to a method of manufacturing such a type of liquid crystal display device as to control the liquid crystal by electric field applied in parallel to a substrate, and is a plan view showing a unit picture element portion (unit pixel portion) of the liquid crystal display device. FIG. 4A is a detailed diagram showing the rubbing treatment direction of the unit pixel portion of FIG. 3, FIG. 4B is a cross-sectional view of FIG. 4A, and FIG. 4C is a partial cross-sectional view of the liquid crystal display device obtained by the first embodiment according to the present invention.

First, gate bus lines 7 and drain bus lines 8 are formed in a grid arrangement on a first transparent glass substrate 6 to form unit pixel portions, and then thin film transistors (TFT) 9 which are active elements serving as switching elements for the unit pixel portions are arranged in a matrix form so that each thin film transistor 9 is located in each unit pixel portion in correspondence with each intersection point of the gate bus lines 7 and the drain bus lines 8. Thereafter, a common electrode 11 and a picture element electrode (pixel electrode) 12 are formed in an interdigital arrangement in each unit pixel portion. Each of the bus lines 7 and 8, the electrodes 11 and 12, etc. are provided by forming a metal film made of chromium at a film thickness of 1000 to 2000 angstroms in a desired pattern by the photolithography method.

Figure 4C:
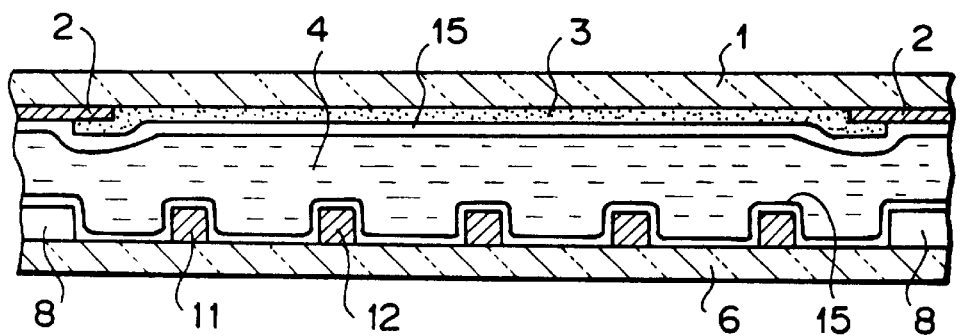
FIG. 4C is a partial cross-sectional view of the liquid crystal display device obtained by the manufacturing method of the first embodiment according to the present invention.

Further, a second transparent glass substrate 1 is provided, and a light shielding film 2 and a colored layer 3 (color filter) are arranged on the second transparent glass substrate 1 which is to be provided so as to confront the first transparent glass substrate 6 as shown in FIG. 4C, in which a liquid crystal layer 4 is disposed between the first and second substrates 6, 1.

Thereafter, an orientation film 15 made of organic material such as polyimide or the like is formed on each of the first and second transparent substrates 6, 1 so as to have a thickness of 500 to 600 angstroms by the offset printing method or the like. Here, when the orientation film 15 is formed on the first glass substrate 6, the orientation film 15 is also formed uniformly on each of the electrodes 11, 12, that is, it is formed so that the unit pixel portion is wholly covered by the orientation film 15.

Subsequently, a rubbing treatment for regulating the orientation direction of liquid crystal molecules is conducted on the surface of the orientation film 15 formed on the first transparent glass substrate 6. This rubbing treatment is performed twice. The first rubbing treatment is performed in a direction 13 (first rubbing direction) which obliquely traverses the common electrode 11 and the pixel electrode 12, that is, at an intersection angle of, for example, 15 degrees to the direction of the electrodes as shown in FIG. 4A. Just after, the second rubbing treatment is performed at the same rubbing intensity as the first rubbing treatment in a direction 14 (second rubbing direction) which is opposite to the first rubbing direction 13 by 180 degrees. A method of performing the rubbing treatment twice is as follows. The first transparent glass substrate 6 on which the active elements 9, etc. are arranged is mounted on a rubbing table, and reciprocatively passed just below a fixed rubbing roller which is disposed above the rubbing table and rotates in one direction while the orientation film 15 of the first transparent glass substrate 6 is brought into contact with the rubbing roller, thereby conducting the rubbing treatment twice.

The orientation treatment method for the orientation film formed on the second substrate in which the colored layer is formed is not limited to a specific method, and the orientation treatment as the orientation treatment method which is applied to the orientation film 15 on the first transparent glass substrate 6 may be performed, or a different method from the above-described method may be applied.

In the liquid crystal display device manufacturing method of the first embodiment, when the orientation film 15 on the first transparent glass substrate 6 which are provided with the active elements 9, etc. is subjected to the rubbing treatment, the rubbing treatment is performed twice so that the rubbing treatment direction set by the first rubbing treatment and the rubbing treatment direction set by the second rubbing treatment are opposite to each other by 180 degrees. Therefore, the portions in the neighborhood of the common electrode 11 and the pixel electrode 12 in each unit pixel portion can be subjected to the sufficient rubbing treatment, and thus no abnormality of orientation occurs in the liquid crystal located in the neighborhood of the electrodes 11, 12, thereby preventing the reduction in contrast which is caused by the orientational abnormality of the liquid crystal in the neighborhood of the electrodes in each unit pixel portion. Further, since plural rubbing treatment directions are set relative to each of row (line) and column directions in an arrangement of the pixel portions, that is, the rubbing treatment is carried out with the first rubbing direction in the neigborhood of each electrode 11, 12 at one side and with the second rubbing direction in the neigborhood of each electrode 11, 12 at another side, the dependence of the image quality on the viewing angle in the vertical direction and in the right-and-left direction can be greatly improved and also a color drift preventing effect can be obtained, so that the image quality can be more enhanced.

Figure 5:
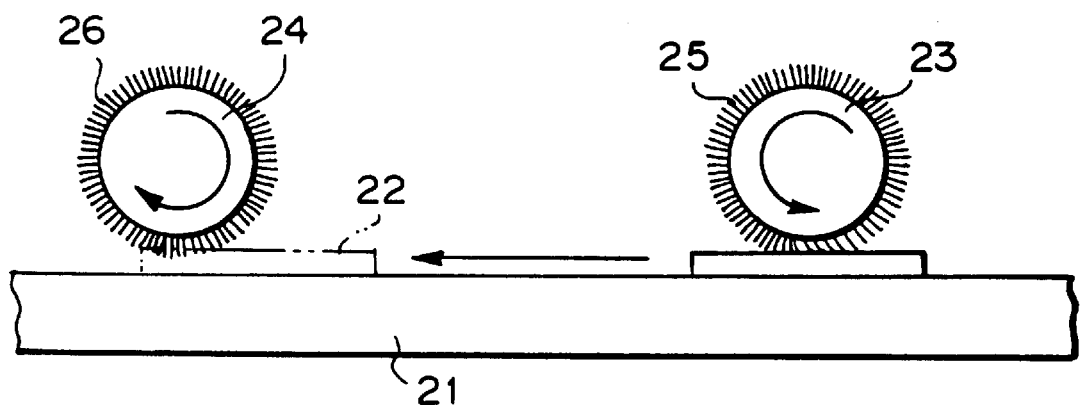
FIG. 5 is a cross-sectional view showing a rubbing treatment method of the second embodiment of the liquid crystal display device manufacturing method of the present invention.

Next, a second embodiment of the liquid crystal display device manufacturing method according to the present invention will be described with reference to FIG. 5.

The liquid crystal display device manufacturing method of the second embodiment is different from that of the first embodiment in the method of rubbing the orientation film 15 provided on the first transparent glass substrate 6.

In the rubbing treatment process of the second embodiment, two rubbing rollers 23, 24 which are rotated in opposite directions are disposed above the rubbing table 21, and a substrate 22 comprising a transparent glass substrate 6 and an orientation film 15 formed on the transparent glass substrate 6 is disposed on the rubbing table 21 with the surface of the orientation film 15 placed face up. This substrate 22 is sequentially passed just below the two rubbing rollers 23 and 24 while being successively brought into contact with the tips 25, 26 of the rubbing cloths of the rubbing rollers 23, 24 to conduct the rubbing treatment on the substrate 22 twice, whereby the first rubbing direction and the second rubbing direction which is opposite to the first rubbing direction by 180 degrees are set on the orientation film.

As described above, in the liquid crystal display device manufacturing method of the second embodiment, when the orientation film 15 on the first transparent glass substrate 6 is rubbed, the two rubbing rollers 23, 24 which are rotated in the opposite directions to each other are used, the first transparent glass substrate 6 having the orientation film 15 formed thereon is continuously passed just below the two rubbing rollers 23, 24 to set the first and second rubbing directions which are opposite to each other by 180 degrees. Therefore, the rubbing treatment can be conducted on the portions in the neighborhood of the common electrode 11 and the pixel electrode 12 in each unit pixel portion, and thus no orientational abnormality occurs in the neighborhood of the electrodes 11, 12, so that the reduction in contrast which is caused by the orientational abnormality of the liquid crystal in the neighborhood of the electrodes in each unit pixel portion can be prevented. Further, the plural rubbing treatment directions can be set relative to each of the row and column directions in the arrangement of the pixel portions, so that the dependence of the image quality on the viewing angle in the vertical direction and in the right-and-left direction can be greatly improved, and also the color shift can be prevented, thereby enhancing the image quality more.

Next, a third embodiment of the liquid crystal display device manufacturing method according to the present invention will be described.

Figure 6:
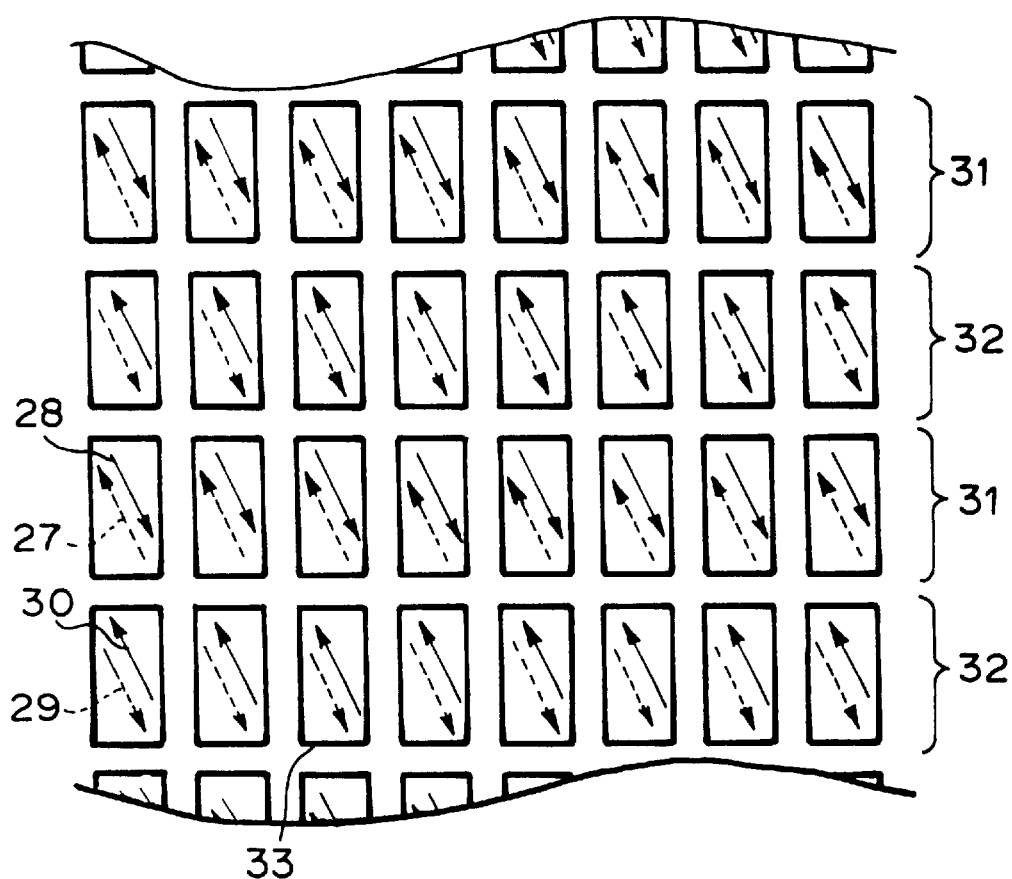
FIG. 6 is a plan view showing a liquid crystal cell having an orientation film which is subjected to a rubbing treatment of a liquid crystal display device manufacturing method of a third embodiment of the present invention.

FIG. 6 is a plan view showing a liquid crystal cell which is subjected to the rubbing treatment by the liquid crystal display device manufacturing method of the third embodiment.

The liquid crystal display device manufacturing method of the third embodiment is different from that of the first embodiment in that when the rubbing treatment is conducted on the orientation film formed on each of the first and second transparent glass substrates which are provided so as to confront each other, different rubbing directions are set on every row of the unit pixel portion 33 or on every group comprising plural rows of the unit pixel portions 33.

In the rubbing treatment method of the third embodiment, the first rubbing treatment is first conducted on the overall surface of the orientation film formed on each of the first and second substrates. In this case, the rubbing direction (first TFT rubbing direction) 27 of the orientation film of the transparent glass substrate provided with the thin film transistors (TFT) serving as the active elements, etc. and the rubbing direction (first CF rubbing direction) 28 of the second substrate provided with a color filter serving as the colored layer are set to be opposite to each other by 180 degrees.

Subsequently, a photosensitive photoresist layer is formed and patterned on each of the first and second substrates so as to mask the unit pixel portions 33 of every other row, and the second rubbing treatment is conducted on the rows of the unit pixel portions 33 which are not masked so that the rubbing treatment direction of the second rubbing treatment is opposite to that of the first rubbing treatment by 180 degrees. At this time, the rubbing direction (second TFT rubbing direction) 29 of the orientation film on the first transparent glass substrate provided with the thin film transistors (TFT) serving as the active elements, etc. and the rubbing direction (second CF rubbing direction) 30 of the orientation film on the second substrate provided with the color filter serving as the colored layer are set to be opposite to each other by 180 degrees. The second TFT rubbing direction 29 set in the second rubbing step is opposite to the first TFT rubbing direction 27 set in the first rubbing step by 180 degrees, and the second CF rubbing direction 30 set in the second rubbing step is opposite to the first CF rubbing direction 28 set in the first rubbing step by 180 degrees.

Subsequently, when the patterned photoresist layer is exfoliated, there can be obtained an orientation film having such a surface state that a first rubbing area 31 obtained by the first rubbing treatment and a second rubbing area 32 obtained by the second rubbing treatment appear alternately as shown in FIG. 6, that is, an orientation film having a surface state in which the rubbing direction is varied every row.

According to the liquid crystal display device manufacturing method of the third embodiment, when the rubbing treatment is conducted on the orientation film on each of the first and second substrates, the first rubbing treatment is first conducted on the whole surface of each substrate, then the unit pixel portions are masked every other row, and then the second rubbing treatment is conducted on the non-masked rows of the unit pixel portions to rub the non-masked rows in the direction which is opposite to the first rubbing treatment direction by 180 degrees, whereby the orientation film is designed to have the surface state in which the rubbing direction is varied every row, and thus the reduction in contrast which causes the orientational abnormality of the liquid crystal in the neighborhood of the electrodes in each unit pixel portion can be prevented. Further, the orientation film has plural rubbing treatment directions, so that the dependence of the image quality on the viewing angle in the vertical direction and in the right-and-left direction can be greatly improved and also the color shift preventing effect can be obtained.

Next, a fourth embodiment of the liquid crystal display device manufacturing method according to the present invention will be described.

Figure 7:
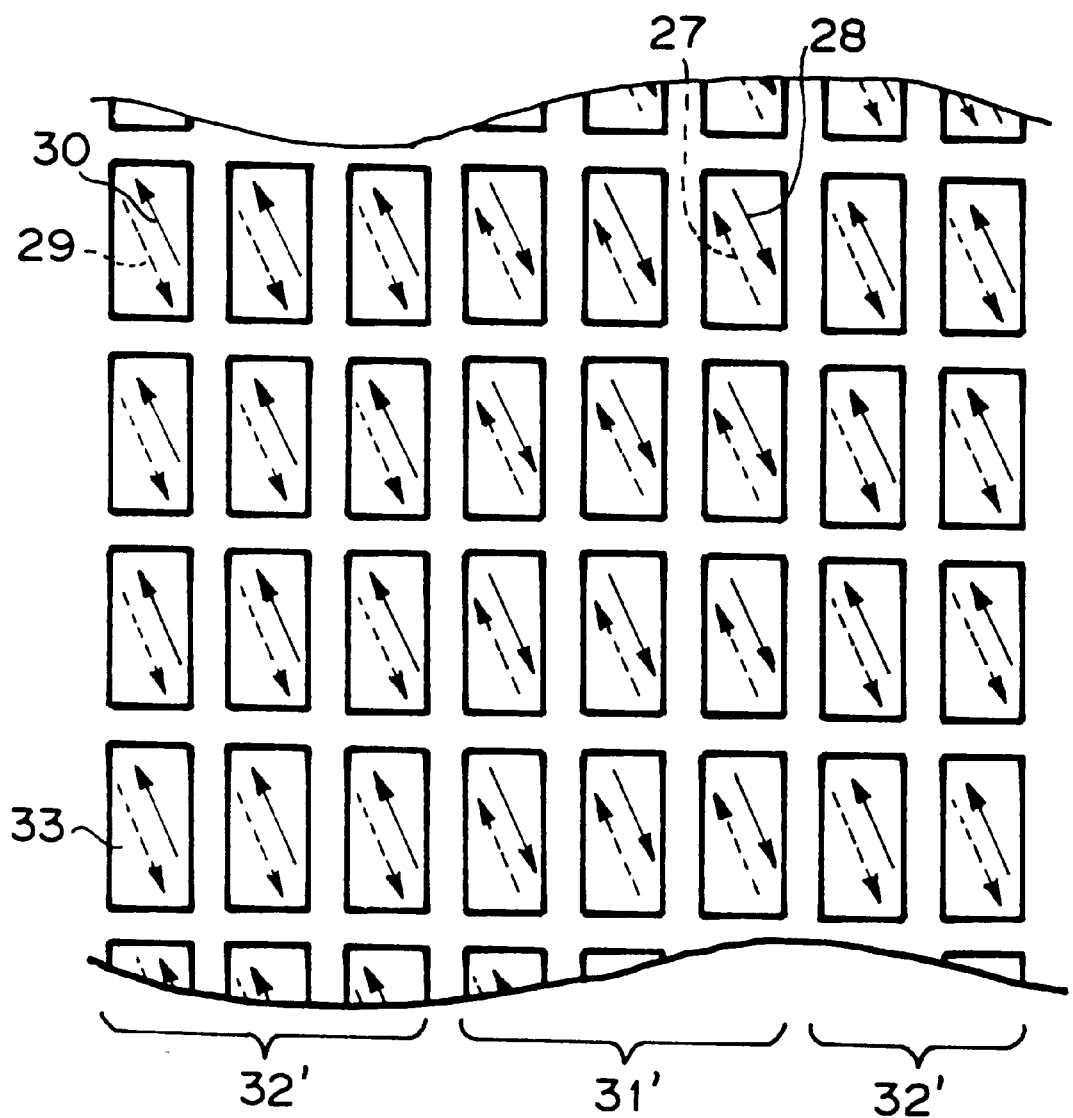
FIG. 7 is a plan view showing a liquid crystal cell having an orientation film which is subjected to a rubbing treatment by a liquid crystal display device manufacturing method of a fourth embodiment of the invention.

FIG. 7 is a plan view showing a liquid crystal cell which is subjected to the rubbing treatment by the liquid crystal display device manufacturing method of the fourth embodiment of the present invention.

The liquid crystal display device manufacturing method of the fourth embodiment is different from that of the third embodiment in that when the rubbing treatment is conducted on the orientation film formed on each of the first transparent glass substrate and the second transparent glass substrate which are disposed so as to confront each other, the orientation film has the rubbing direction which is varied every column or every group comprising plural columns of the unit pixel portions 33.

In the rubbing treatment method of the fourth embodiment, the first rubbing treatment is first conducted on the overall orientation film of each of the first transparent glass substrate and the second substrate. At this time, the rubbing direction (first TFT rubbing direction) 27 of the orientation film on the transparent glass substrate provided with the thin film transistors (TFT) serving as the active elements, etc. and the rubbing direction (first CF rubbing direction) 28 of the orientation film on the second substrate provided with the color filter serving as the colored layer are set to be opposite to each other by 180 degrees.

Subsequently, a photosensitive photoresist layer is formed and patterned on each of the first transparent glass substrate and the second substrate to mask the unit pixel portions 33 every other group of three columns, and the second rubbing treatment is conducted on the non-masked columns of the unit pixel portions 33 so that the rubbing direction of the second rubbing treatment is opposite to that of the first rubbing treatment by 180 degrees. At this time, the rubbing direction (second TFT rubbing direction) 29 of the orientation film on the first transparent glass substrate provided with the thin film transistors (TFT) serving as the active elements, etc. and the rubbing direction (second CF rubbing direction) 30 of the orientation film on the second substrate provided with the color filter serving as the colored layer are set to be opposite to each other by 180 degrees. The second TFT rubbing direction 29 set in the second rubbing step is opposite to the first TFT rubbing direction 27 set in the first rubbing step by 180 degrees, and the second CF rubbing direction 30 set in the second rubbing step is opposite to the first CF rubbing direction 28 set in the first rubbing step by 180 degrees.

Subsequently, when the patterned photosensitive photoresist layer is exfoliated, the orientation film having the surface state in which the rubbing direction is varied every group of three columns as shown in FIG. 7 can be obtained. In FIG. 7, reference numeral 31' represents a first rubbing area which is obtained in the first rubbing step, and reference numeral 32' represents a second rubbing area which is obtained in the second rubbing step.

According to the liquid crystal display device manufacturing method of the fourth embodiment, when the rubbing treatment is conducted on the orientation film which is formed on each of the first and second substrates, the first rubbing treatment is first conducted on the whole surface of the substrate, then the unit pixel portions are masked every other group of three columns, and the second rubbing treatment is conducted on the non-masked columns of the unit pixel portions in the rubbing direction which is opposite to that of the first rubbing treatment by 180 degrees, and the orientation film having the surface state in which the rubbing direction is varied every group of three columns can be obtained, thereby preventing the reduction of contrast which is caused by the orientational abnormality of the liquid crystal in the neighborhood of the electrodes in each unit pixel portion. In addition, the orientation film has plural rubbing treatment directions, so that the dependence of the image quality on the viewing angle in the vertical direction and in the right-and-left direction can be greatly improved and the image quality can be enhanced.

Figure 8A:
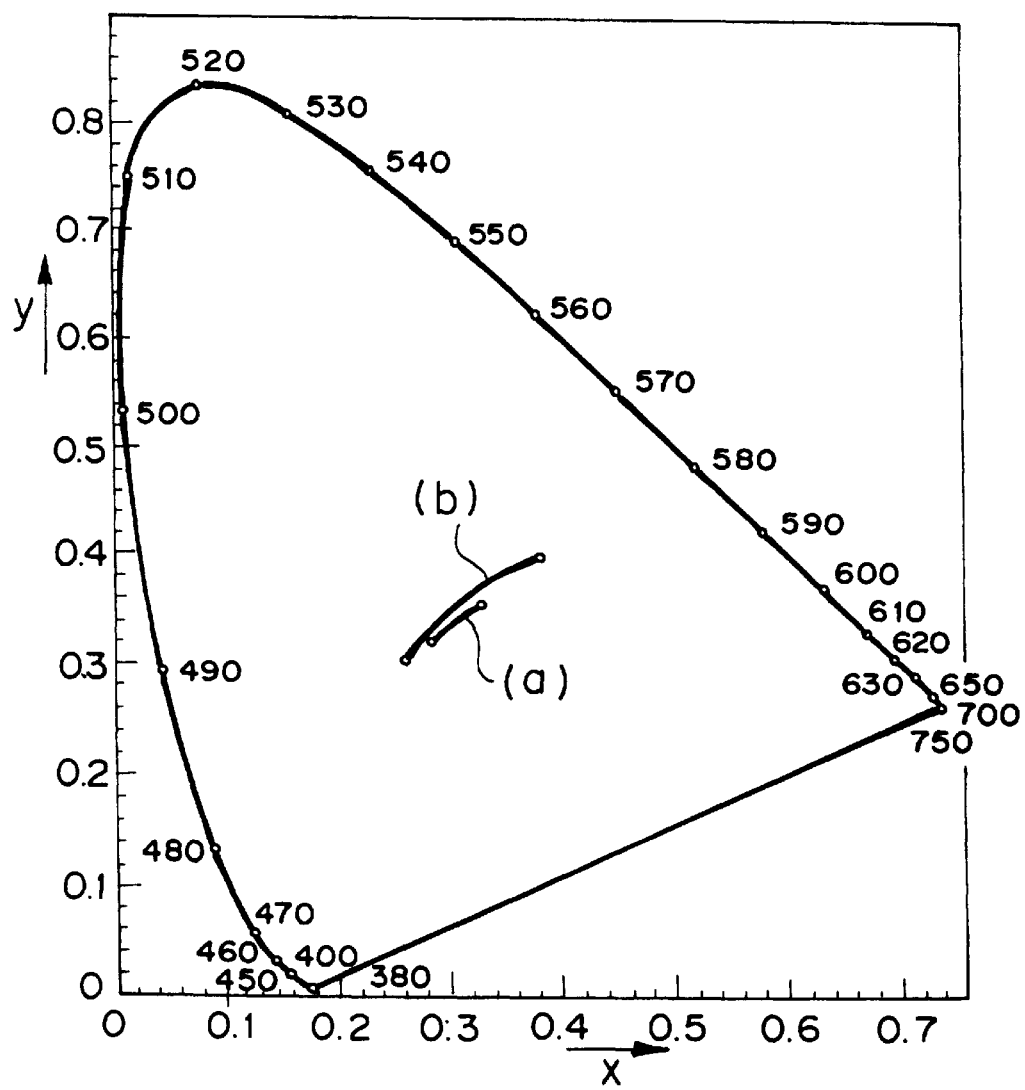
FIG. 8A is a chromaticity diagram.
Figure 8B:
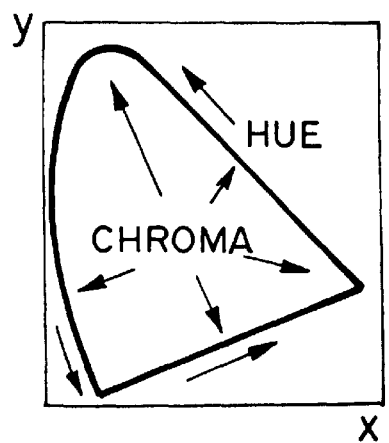
FIG. 8B is a diagram for explaining the hue and chroma shown by FIG. 8A.

FIG. 8A is a chromaticity diagram and FIG. 8B is a diagram for explaining the hue and chroma shown in FIG. 8A. In FIG. 8A, there are shown the chromaticity characteristic of the liquid crystal display device having the orientation film which is subjected to the rubbing treatment by the liquid crystal display device manufacturing method of the fourth embodiment, and the chromaticity characteristic of the liquid crystal display device having the orientation film which is subjected to the rubbing treatment by the conventional method, which is introduced for comparison purpose. FIG. 8A is a graph showing the locus of the white-color chromaticity when a white display frame is viewed with the viewing angle 60 degrees relative to the normal direction of the display. In FIG. 8A, a curved line (a) represents the locus of the white-color chromaticity of the liquid crystal display device which is manufactured by the fourth embodiment of the liquid crystal display device manufacturing method of the present invention, and a curved line (b) represents the locus of the white-color chromaticity of the liquid crystal display device manufactured by the conventional method.

As is apparent from FIG. 8A, it is found that the liquid crystal display device which is manufactured by the method of the present invention has less coloring (color staining) than the liquid crystal display device which is manufactured by the conventional method. Accordingly, in the case of the liquid crystal display device which is manufactured by the method of the present invention, the orientational abnormality in the neighborhood of the electrodes in each of the display pixel portion can be suppressed, and the display failure and the dependence of the image quality on the viewing angle can be greatly improved because of the plural rubbing directions are provided to the orientation film.

As described above, the liquid crystal display device manufacturing method of the first aspect of the present invention includes at least the following rubbing step: when the orientation film on the first transparent substrate is rubbed, the rubbing treatment is performed twice so that the first rubbing direction set in the first rubbing step and the second rubbing direction set in the second rubbing step are opposite to each other by 180 degrees. Accordingly, no orientational abnormality of the liquid crystal occurs in the neighborhood of the electrodes, thereby preventing the reduction of contrast which is caused by the orientational abnormality of the liquid crystal in the neighborhood of the electrodes in each unit pixel portion. In addition, since the plural rubbing treatment directions are provided in each of the row and column directions of the display pixel portion, the dependence of image quality on the viewing angle in the vertical direction and in the right-and-left direction can be greatly improved, and the color shift or color staining can be prevented. Therefore, the image quality can be enhanced.

Further, according to the second aspect of the present invention, in the liquid crystal display device manufacturing method of the first aspect of the present invention, when the rubbing treatment is conducted on the orientation film on the first transparent substrate, the two rubbing rollers which are rotated in the opposite directions are used, and the first transparent substrate having the orientation film formed thereon is sequentially passed just below the two rubbing rollers, whereby the same effect as the first aspect of the present invention can be obtained and also the rubbing treatment can be more efficiently performed.

Still further, according to the third aspect of the present invention, when the rubbing treatment is conducted on the orientation film formed on each of the first and second substrates, the first rubbing treatment is conducted on the whole surface of the substrate in the first rubbing direction, then the unit pixel portions are masked every other row or every other group of plural rows, and then the second rubbing treatment is conducted on the non-masked rows of the unit pixel portions in the second rubbing direction which is opposite to the first rubbing direction by 180 degrees to thereby obtain the orientation film having the surface state in which the rubbing direction is varied every row or every group of plural rows in each unit pixel portion, so that the reduction of the contrast which is caused by the orientational abnormality of the liquid crystal in the neighborhood of the electrodes in each unit pixel portion can be prevented, the dependence of image quality on the viewing angle in the vertical direction and in the right-and-left direction can be greatly improved, and the color shift or color staining can be prevented because the plural rubbing treatment directions are set on the orientation film. Therefore, the image quality can be enhanced.

Still further, according to the fourth aspect of the present invention, when the rubbing treatment is conducted on the orientation film formed on each of the first and second substrates, the first rubbing treatment is conducted on the whole surface of the substrate in the first rubbing direction, then the unit pixel portions are masked every other column or every other group of plural columns, and then the second rubbing treatment is conducted on the non-masked columns of the unit pixel portions in the second rubbing direction which is opposite to the first rubbing direction by 180 degrees to thereby obtain the orientation film having the surface state in which the rubbing direction is varied every column or every group of plural columns in each unit pixel portion, so that the reduction of the contrast which is caused by the orientational abnormality of the liquid crystal in the neighborhood of the electrodes in each unit pixel portion can be prevented, the dependence of image quality on the viewing angle in the vertical direction and in the right-and-left direction can be greatly improved, and the color shift or color staining can be prevented because the plural rubbing treatment directions are set on the orientation film. Therefore, the image quality can be enhanced.

What is claimed is:

1. A method of manufacturing a liquid crystal display device, the method comprising: disposing gate bus lines and drain bus lines on a first transparent substrate, disposing active elements in a matrix form at respective intersection points of the gate bus lines and the drain bus lines, disposing a common electrode and a pixel electrode in an interdigital arrangement on the first transparent substrate, providing a second transparent substrate so as to confront the first transparent substrate, and disposing an orientation film on each of the first substrate and the second substrate, an entirety of at least one area of the orientation film on the first substrate being subjected to a rubbing treatment having a first step and a second step, the at least one area including said common electrode and said pixel electrode, wherein the first step of the rubbing treatment is in a first rubbing direction across said entirety of said at least one area and the second step of the rubbing treatment is in a second rubbing direction across said entirety of said at least one area, said second rubbing direction being opposite the first rubbing direction by 180 degrees.

2. The method as claimed in claim 1, wherein when the orientation film on the first substrate is subjected to the rubbing treatment, two rubbing rollers rotating in opposite directions are used, and the first substrate on which the orientation film is formed is sequentially passed just below the two rubbing rollers.

3. The method as claimed in claim 1, further comprising disposing a light shielding film and a colored layer on the second substrate.

4. The method as claimed in claim 1, wherein the first substrate is made of glass, the second substrate is made of glass, and each of the active elements comprises a thin film transistor.

5. A method of manufacturing a liquid crystal display device, the method comprising: disposing gate bus lines and drain bus lines on a first transparent substrate, disposing active elements in a matrix form at respective intersection points of the gate bus lines and the drain bus lines, disposing a common electrode and a pixel electrode in an interdigital arrangement on the first transparent substrate, providing a second transparent substrate so as to confront the first transparent substrate, and disposing an orientation film on each of the first substrate and the second substrate, each orientation film being subjected to a rubbing treatment having a first treatment and a second treatment, wherein when the orientation film formed on each of the first substrate and the second substrate is subjected to the rubbing treatment, the first treatment is first conducted on an overall surface of the first substrate and the second substrate in a first rubbing direction, the overall surface of the first substrate including an entirety of at least one area of the first substrate, unit pixel portions of the at least one area of the first substrate are masked over one of every other row and every other group of plural rows, and then the second treatment is performed on non-masked rows of the unit pixel portions across the entirety of the at least one area so as to rub the non-masked rows across the entirety of the at least one area in a second rubbing direction that is opposite the first rubbing direction by 180 degrees such that at least one unit pixel portion is rubbed both in the first rubbing direction and the second rubbing direction.

6. The method as claimed in claim 5, further comprising disposing a light shielding film and a colored layer on the second substrate.

7. The method as claimed in claim 5, wherein the first substrate is made of glass, the second substrate is made of glass, and each of the active elements comprises a thin film transistor.

8. A method of manufacturing a liquid crystal display device, the method comprising: disposing gate bus lines and drain bus lines on a first transparent substrate, disposing active elements in a matrix form at respective intersection points of the gate bus lines and the drain bus lines, disposing a common electrode and a pixel electrode in an interdigital arrangement on the first transparent substrate, providing a second transparent substrate so as to confront the first transparent substrate, and disposing an orientation film on each of the first substrate and the second substrate, each orientation film being subjected to a rubbing treatment having a first treatment and a second treatment, wherein when the orientation film formed on the first substrate and the second substrate is subjected to the rubbing treatment, the first treatment is first conducted on an overall surface of the first substrate and the second substrate in a first rubbing direction, the overall surface of the first substrate including an entirety of at least one area of the first substrate, unit pixel portions of the at least one area of the first substrate are masked on one of every other column and every other group of plural columns, and the second treatment is performed on non-masked columns of the unit pixel portions across the entirety of the at least one area so as to rub the non-masked columns across the entirety of the at least one area in a second rubbing direction that is opposite the first rubbing direction by 180 degrees such that at least one unit pixel portion is rubbed both in the first rubbing direction and the second rubbing direction.

9. The method as claimed in claim 8, further comprising disposing a light shielding film and a colored layer on the second substrate.

10. The method as claimed in claim 8, wherein the first substrate is made of glass, the second substrate is made of glass, and each of the active elements comprises a thin film transistor.

* * * * *